United States Patent [19]
Marocco

[11] 3,905,412
[45] Sept. 16, 1975

[54] SAFETY TIRE HAVING AUTOMATIC INFLATING MEANS IN THE EVENT OF TEARS OR PUNCTURES

[75] Inventor: Sergio Marocco, Milan, Italy

[73] Assignee: Industrie Pirelli S.p.A., Milan, Italy

[22] Filed: July 25, 1973

[21] Appl. No.: 382,364

[30] Foreign Application Priority Data
Aug. 4, 1972  Italy .................................. 27895/72

[52] U.S. Cl. .............................. 152/340; 152/418
[51] Int. Cl.² ......................................... B60C 17/02
[58] Field of Search ........... 152/418, 419, 415, 339, 152/340, 341, 342

[56] References Cited
UNITED STATES PATENTS

| | | | |
|---|---|---|---|
| 1,342,297 | 6/1920 | Prudhomme | 152/339 |
| 2,237,245 | 4/1941 | Wilson | 152/342 |
| 2,552,031 | 5/1951 | Booth | 152/418 |
| 2,742,075 | 4/1956 | Courchesne | 152/418 |
| 3,087,528 | 4/1963 | Hindin | 152/339 |
| 3,487,870 | 1/1970 | Huber | 152/340 |

*Primary Examiner*—Robert B. Reeves
*Assistant Examiner*—Thomas E. Kocovsky
*Attorney, Agent, or Firm*—Stevens, Davis, Miller & Mosher

[57] ABSTRACT

A pneumatic tire with an inflatable structure comprising an annular band of deformable sealing material inside the tire casing is disclosed. Inflating means are also provided within the tire which allows for automatic inflation of the tire in the event of a tear or puncture in the tire. The width of the annular band is at least equal to that of the tire band when the tire is in working condition.

17 Claims, 8 Drawing Figures

SAFETY TIRE HAVING AUTOMATIC INFLATING MEANS IN THE EVENT OF TEARS OR PUNCTURES

The present invention concerns a safety tire having a structure which is inflatable by inflation means which can be automatically actuated in the event of a puncture or a tear in the tire.

Safety tires of the tubeless type are already known which have their inside provided with a structure which can be inflated after a puncture or a tear in the tire has occurred and which allows the tire to bear a pre-established load for a period of travel sufficient to reach a repair station.

This structure, built up with foldable and relatively non-elastic material, for instance several cord plies, can pass from a first rest position, wherein it is folded inside the tire, to a second working position, where it is inflated and contacts the inner tire surface.

This type of pneumatic tire gives rise to some drawbacks.

Initially, the inflatable structure is rather complicated and has to be provided with means permitting it to remain folded in a pre-established manner in the first indicated position. Moreover, if the depth of penetration of a foreign body which penetrates in the tread band of the tire is greater than the thickness of the band, the structure itself can be perforated by the foreign body. Finally, there is no automatic inflation of the structure, nor does it take place as the tire deflation progresses, rather a direct intervention of the vehicle's driver is required to admit air or gas under pressure to the structure, when the tire is completely deflated.

The present invention aims to provide a safety tire which overcomes the above indicated disadvantages.

The tire of the present invention, having a casing, is characterized in that provision is made, inside said casing, for an inflatable structure comprising an annular band of deformable sealing material capable of sealing a hole appearing in the casing material, the width of which is at least equal to that of the tread band of the tire, when the tire is in working condition. The annular band is situated in a first position in which it is not in contact with the inner surface of the casing. Means for inflating said structure to pneumatically displace said annular band to a second position in which it is in contact with said surface and lies below the tread band are also provided.

For a better understanding of the invention, some particular embodiments thereof will now be described by way of example with reference to the attached drawings, in which.

Figure 7:
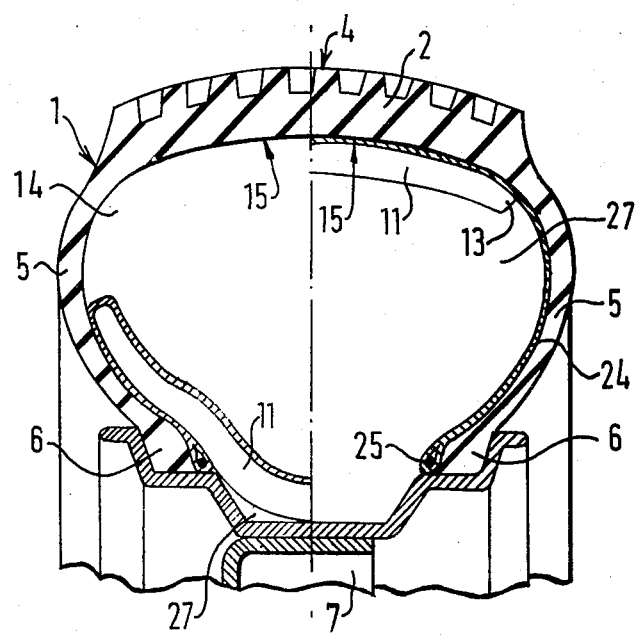
Figure 8:
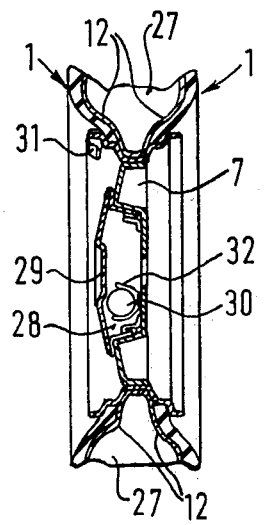

FIG. 7 represents a section, analogous to those of the preceding figures, of a tire corresponding to a fourth embodiment of the invention, the left and right parts of the section representing the inflatable structure in the rest and working position, respectively; and FIG. 8 represents diagrammatically the section of a rim having a tire according to the invention fitted thereon, and which is provided with a bottle containing liquid gas for inflating the structure.

Figure 1:
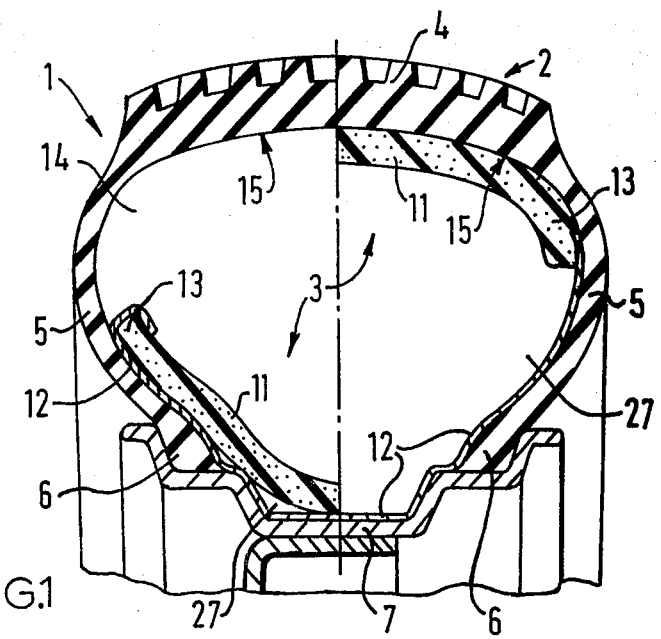
FIGS. 1 and 2 are sections, taken along a diametrical plane, of pneumatic tires corresponding to one embodiment of the invention. In the left part of each section the tire is shown in the condition in which the inflatable structure with which it is provided is in the rest position, and, in the right part, it is shown in the condition in which said structure is in the working position.

Referring first to the embodiment shown in FIG. 1, the tire of the present invention, indicated in its entirety as 1, comprises substantially a casing 2, inside which is arranged an inflatable structure, shown generally as 3. The casing 2 can conveniently be a normal casing for tubeless tires, and it comprises a tread band 4, sidewalls 5 and beads 6, by means of which the casing is tightly fitted onto rim 7. A liner, substantially formed of a soft rubber compound, can be conveniently situated on the inner surface of the casing 2.

The inflatable structure 3 comprises substantially an annular band 11, made of deformable sealing material, known per se, capable of sealing a puncture which may take place in the tread band 4; the width of the annular band is at least equal to that of the tread band. Even if the material forming said annular band can be any sealing material of known characteristics, it is conveniently made from elastic foam material.

In the embodiment of FIG. 1, the inflatable structure 3 comprises a deformable element 12 whose lateral edges are secured, in any appropriate manner, to lateral edges 13 of the annular band 11. The deformable element is designed to lean both on the sidewalls 5 of the casing 2, and on the rim 7, originating an annular tight envelope for the inflation air which is admitted in the structure, as will be explained infra.

The annular band 11, in the normal working condition of the tire, is situated in a first position, represented in the left part of the section shown in FIG. 1. In this position the annular band leans substantially on the deformable element 12 which also leans on the sidewalls 5, the beads 6 of the casing 2 and on the rim 7 serially; in this way, a cavity 14 is formed for the inflation air, which is substantially defined as between the outer surface of the annular band 11 and the inner surface 15 of the casing 2. The cavity 14 can be put into communication, by conventional known means, with a source of compressed air or gas for the normal inflation of the tire. As it will be further described, the band 11 can be displaced from said first position to a second position, in which it is in contact with the surface 15 of the casing 2, as represented in the right part of the section of FIG. 1. This displacement is carried out by the action of means described herein, which can be automatically actuated when a puncture or a tear takes place in the casing 2. As the annular band 11 is circumferentially deformed in a considerable manner when it passes from the above indicated first position to the second, the material of which it is composed must possess, in addition to the above mentioned characteristics, a high deformability. It is preferred that said material have an ultimate elongation of at least 150%.

When the material forming the annular band 11 is an elastic foam material, it has prevailingly closed cells; even if it can be assumed that intercommunicating cells exist in said material, it is believed that, on the whole, the number of closed cells is preponderant and that, by adopting for the annular band 11 a thickness which will be indicated, a band is obtained which, substantially, cannot be penetrated by the inflation air. Conveniently, said elastic foam material is a foam of vulcanized rubber, or a plastic material, which is obtained according to the normal techniques used to produce foams of elastic material. Moreover, conveniently, said forming operation is so carried out that, at its end, inside each closed cell of the material there is a pre-established pressure whose value is substantially equal that of the tire inflation pressure. If said requirement is complied with, the variation in the shape of the annular band, in its passage from the condition in which it is at the end of said forming operation to the working condition (in the presence of the tire inflation air) is obviously substantially negligible.

The thickness of the band 11, measured in a radial direction in the condition in which it is in the second position, is no greater than 20 mm. Moreover, the density of the material forming the band is such that the moment of polar inertia of the band itself in said first position, measured with respect to its axis of rotation, is no greater than one fifth of the moment of polar inertia of the tire without the band. If this condition exists, the variation of the moment of inertia, which takes place when a wheel equipped with a tire according to the present invention is used instead of a wheel equipped with a conventional tire, can be acceptable.

Figure 2:
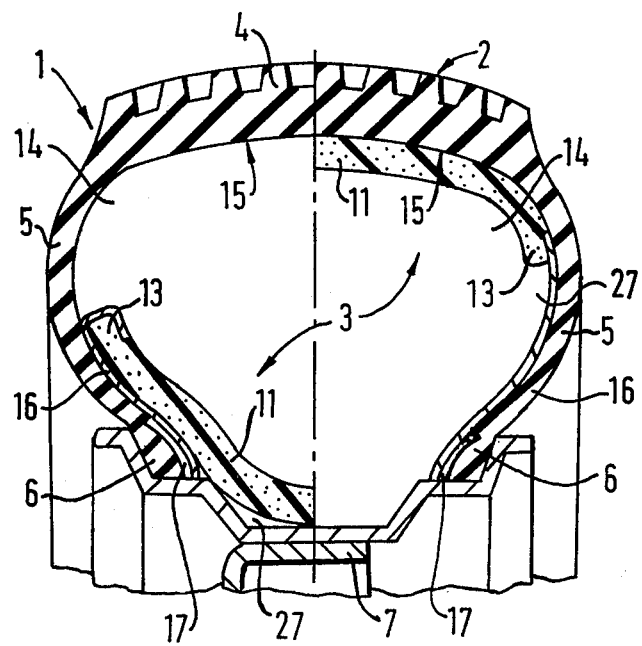

The deformable element 12 can be replaced — as in the tire shown in FIG. 2 — by a pair of deformable annular sidewalls 16, each of which is intended to lean substantially on the inner surface of a corresponding sidewall 5 of the casing 2. The outer circular edge of each of said sidewalls is secured to a corresponding edge 13 of the annular band 11, while the inner circular edge of each of them is tightly connected with the inner surface of a corresponding bead 6 of the casing 2. This connection can be carried out by a coating of an adhesive agent 17 for example.

Figure 3:
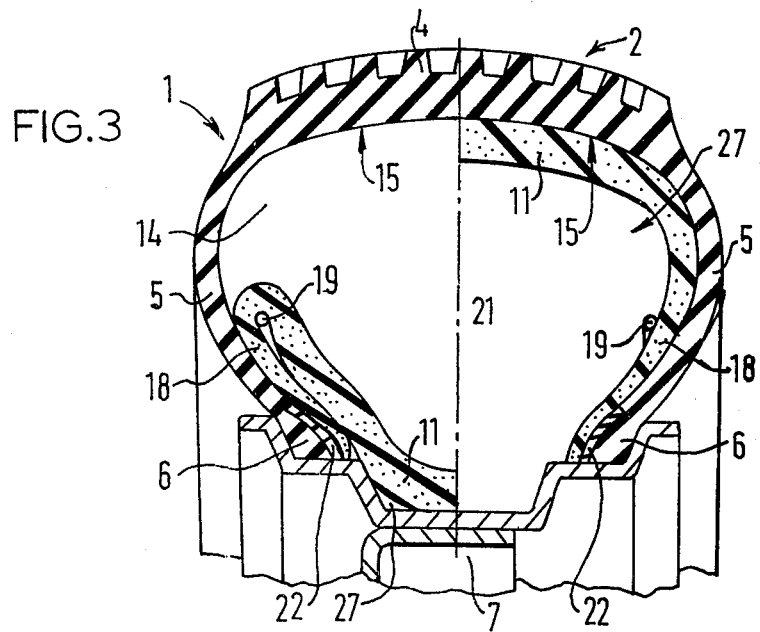
FIGS. 3 and 4 are sections, similar to those of FIGS. 1 and 2, of tires corresponding to another embodiment of the invention, the left and right parts of each section of the invention, the left and right parts of each section representing the inflatable structure in the rest and working position, respectively.
Figure 4:
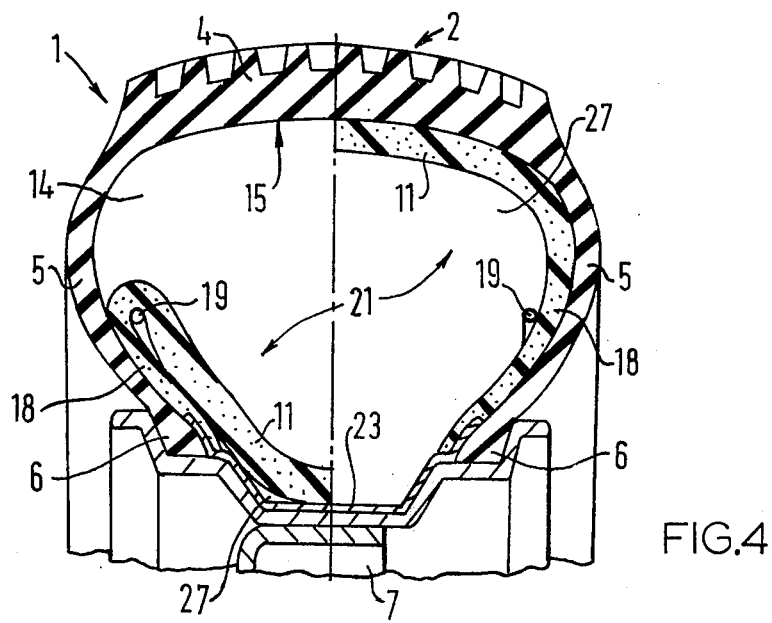

The deformable structure 3 of the embodiment shown in FIGS. 3 and 4 differs from that of the preceding figures as the annular band 11 is provided with sidewalls 18 formed of the same sealing material as that constituting the band itself; in this way a single element comprising the annular band and the sidewalls is obtained, which is indicated in its whole as 21. Conveniently, the thickness of each sidewall 18 of said element decreases towards the corresponding bead 6 of the casing 2; moreover, between each sidewall 18 and the band 11 there is a ring 19, which defines the circumference in correspondence of which the folding between the sidewall and the band takes place when the deformable structure 3 is in the first of the two above indicated positions. The inner circular edges of each of the sidewalls are tightly connected on the inner surface of the corresponding bead 6, for instance by means of a coating of an adhesive agent 22, as shown in FIG. 3.

According to an alternative arrangement, the inner circular edges of said sidewalls are connected to the corresponding edge of a deformable annular element 23 (FIG. 4) capable of leaning on the rim 7 forming a tight envelope for the inflation air with element 21.

Figure 5:
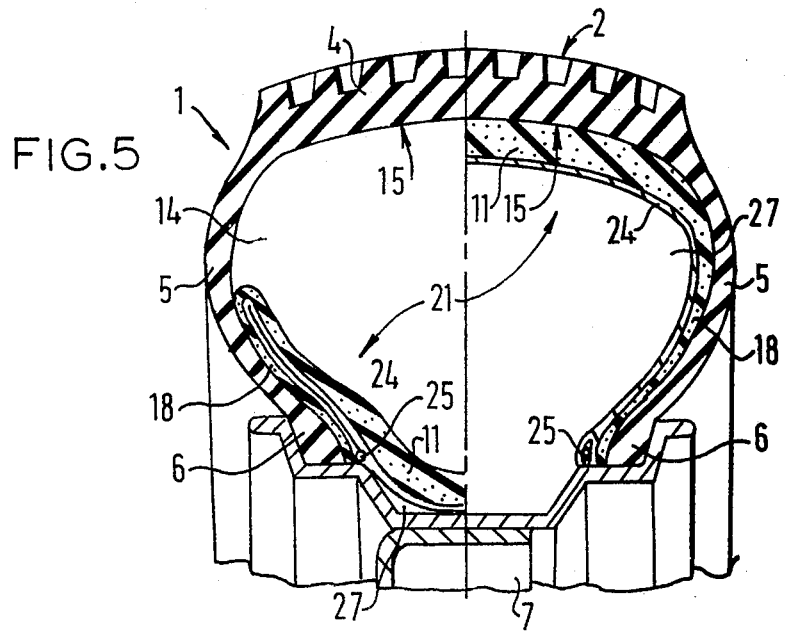
FIGS. 5 and 6 are sections, like those of FIGS. 1 to 4, of tires corresponding to a third embodiment of the invention, the left and right parts of each section representing the inflatable structure in the rest and working position, respectively.
Figure 6:
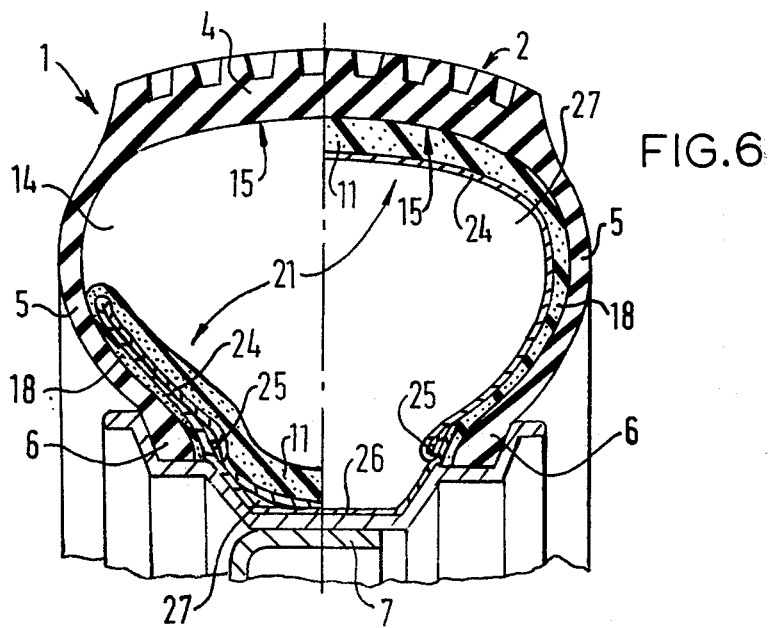

The tire of the embodiment illustrated in FIGS. 5 and 6 also contains an element 21, quite similar to that of the tire of the embodiments of FIGS. 3 and 4, and is further provided with a band 11 and sidewalls 18, formed of the same material as the band. Inside said element there is s small carcass 24, designed to lean on the inner surface of the element 21 both when it is in the first of the two above indicated positions (represented at the left in FIG. 5) and when it is in the second of said positions (represented at the right in FIG. 5).

The small carcass can also be secured on the surface 21 by bonding.

The small carcass 24 conveniently comprises one or more layers of a deformable material, normally rubber, having metallic or textile cords embedded therein and whose inside arrangement is substantially radial. The material must be highly deformable in order to allow the small carcass to be deformed from the shape it has in said first position to the shape it takes in the second position. Conveniently, the ultimate elongation of said material must be at least 150%. The length of each radial cord of the small carcass is such as to allow the latter to pass from the first to the second position without causing remarkable elongations in said cords. By a different arrangement, the small carcass 24 can be an integral part of the band 11; in such a case said cords of the small carcass can be directly embedded in the foam material forming the band and can be situated in proximity of the inner surface of said band.

The small carcass 24 is provided with cores 25, as represented for the tire of FIGS. 5 and 6, which can ensure a radial anchorage of said small carcass and can exert a pressure on the inner circular edges of the sidewalls 18 of element 21 in order to provide the seal between said edges and the corresponding beads 6 of the casing 2.

According to an alternative embodiment illustrated in FIG. 6, each inner circular edge of the small carcass 24 is secured to the corresponding edge of an annular deformable element 26, intended to lean on the rim 7 and to constitute a tight annular envelope with the small carcass.

In the embodiment shown in FIG. 7, which is different from that shown in FIGS. 5 and 6, the small carcass 24 is situated outside the element 21.

The above described means, able to inflate the inflatable structure 3, comprise a source of fluid which can be put into communication, in any appropriate manner, with the cavity 27 (FIG. 1) existing inside the inflatable structure 3, when the pressure of the inflation air or gas contained in the cavity 14, defined as between the inner surface 15 of the casing 2 and the outer surface of the band 11 decreases in respect of a pre-established value. The source of fluid is conveniently constituted by a bottle of compressed air or of any other gas (for instance carbon dioxide) or by any device capable of generating a gas and supplying it, under pressure, in the cavity 27, said means being situated on the vehicle. The communication between said source and the cavity 27 can be direct, namely carried out without the interposition of valves, and the supply can be effected automatically, as soon as the pressure inside the cavity 14 decreases.

According to a preferred embodiment, said source of fluid is situated on the rim on which the tire is fitted, and is constituted by a bottle of liquid gas which can be converted to the gaseous state as it enters the cavity 27. In this case, between the cavity of the bottle and the cavity 27 there is a valve which opens automatically when the pressure in the cavity 14 falls below a pre-established value. In said arrangement, represented in FIG. 8, a cavity 28 of the rim, below the wheel cup 29 with which said rim is normally provided, contains a bottle 30 filled with liquid gas, which is in communication with the cavity 27, such arrangement is not illustrated. Conveniently, said liquid gas is a fluoro-chloro hydrocarbon, as for instance dichlorodifluoromethane, known as Freon 12 ($CCl_2F_2$) or monochloropentafluoroethane, known as Freon 115 ($CClF_2-CF_3$). The appropriate selection of said gases is due to the fact that they are not flammable, are not noxious to persons and are chemically inert with respect to the materials used in the tire.

The bottle is mounted eccentrically with respect to the rim axis, and is balanced with the normal balancing masses with which said rims are provided, for instance by means of mass 31. This balancing is quite easy, since the amount, and therefore the weight, of liquid gas necessary to originate in the cavity 27 a pressure sufficient for the inflation of the inflatable structure 3, is somewhat low. The weight of the bottle is of the order of 200–300 g in the case of a motor vehicle tire.

The bottle 30, mounted with the desired eccentricity with respect to the rim axis, is provided with supporting means 32, allowing for its easy replacement, both in the event of a periodic check and after the utilization of the compressed gas therein contained.

The working of the described tire, in service and in emergency conditions (puncture and burst), occurs as follows:

The deformable structure 3 is mounted inside the casing 2 in such a way that it takes the shape represented in the left part of the figures, namely it is completely deflated and the volume of its inner cavity 27 is nearly nul. In this configuration, the annular band 11 leans, with the interposition of the outer parts of the structure, on the sidewalls 5, the beads 6 and the rim 7. By supplying inflation air inside the cavity 14, the tire is inflated and the band 11 remains pressed against the above mentioned parts.

Let us assume that a foreign body enters the tread band 5, penetrating inside it. The compressed air contained in the cavity 14 flows out through the formed hole and therefore the pressure inside said cavity decreases rapidly; as a result of the pressure drop, the above indicated valve opens and the liquid compressed gas contained in the bottle 30 (FIG. 8) and in communication, through said valve, with the cavity 27, passes from the liquid to the gaseous state and displaces upward, at first, the annular band 11 in order to bring it into contact with the surface 15 of the casing 2; subsequently, it inflates the inflatable structure 3 at a preestablished pressure, depending upon the pressure and the amount of liquid gas contained in the bottle. The passage of the annular band 11 from the first to the second position is possible on account of the high deformability of the material of which it is formed.

The sealing material forming the annular band 11 tends to fill the inside of the hole of the tread band 5, under the pressure of the air inflating the inflatable structure 3, and to close it. In particular, if the depth of penetration of the foreign body is greater than the thickness of the tread band 5, said body can damage the band 11 when this comes into contact with the surface 15, puncturing it in a partial or total fashion. In said case, if the material forming the annular band 11 is an elastic foam material, two conditions can substantially be noticed. In the first case, if the surface of the foam material damaged in correspondence of the foreign body is perfectly impermeable (namely a zone of closed cells exists at that point), under the thrust of the inner pressure, the surface of said material adheres intimately to the surface of the body itself, preventing any escape. If, on the other hand, a certain percentage of intercommunicating open cells exists in the material, in the immediate proximity of the body, said cells form a plurality of cavities, more or less branched, through which a distribution of pressure and of outflow speed is created, which is regulated by the extreme values of the pressure (atmospheric pressure and pressure inside the inflatable structure 3) and by the friction originated by the motion of air inside the cavities; at the same time, however, the more or less pronounced reduction of pressure in the open cells with respect to its initial value will cause the closed cells, adjacent to them, to increase in volume. It follows that there is a reduction in the volume of the open cells, namely a reduction of the average section of th cavities, with a consequent increase of friction and decrease of the outflow. It can be understood that, the greater the percentage of closed cells, and the lower the elastic reaction of the material to the increase in volume of said closed cells, the more reduced to air loss, due to the puncturing of the band 11, at the end of the above indicated transitory period.

If the small carcass 24 is associated to the tire structure of the embodiments shown in FIGS. 3 and 4, obtaining in this way the structure of the embodiments of FIGS. 5, 6, and 7, the tire according to the present invention, in addition to providing the above described sealing action, is also able to carry out an efficient antiburst action, which takes place in the following way.

Let us assume a tear occurs in casing 2, which normally happens in one of the sidewalls 5; the inflatable structure 3 is inflated, as it has been described for the preceding embodiment. In particular, owing to the high deformability of the material forming the small carcass 24 and of the substantially radial arrangement of the cords of said small carcass, the latter can pass, without being damaged, from its rest position (at the left in FIGS. 5 and 6) to its working position (at the right in said Figures). When the second position is reached, owing to the presence of the sidewalls 18 of the element 21, which act as a true upholstery for the small carcass 24, the tear does not extend to said small carcass, and this, therefore, does not suffer the damage which occurred in casing 2. Subsequently, the portion of the small carcass which is situated in proximity of the tear is pushed, for the action of the air inflating the inflatable structure 3, towards said tear, wherein it behaves as a true patch, preventing the escape of the air therein contained and allowing therefore the vehicle to carry out an emergency travel of a certain length, sufficient anyhow to reach a repair station.

Obviously, a behavior like that described above is noticed in the embodiment illustrated in FIG. 7.

It is evident that when the liquid compressed gas flows from the bottle 30 in the cavity 27 of the inflatable structure 3, a displacement of masses takes place in the wheel, which causes an unbalanced condition in same. This condition is easily noted by the driver, who is immediately made award of the accident and of the need of having the tire repaired as soon as possible.

It is understood that the embodiments described in the present invention can be appropriately modified without falling out of the scope of the invention itself.

What is claimed is:

1. In a pneumatic tire having a tread band and a casing, the improvement which comprises
providing inside said casing an inflatable structure comprising an annular band of deformable sealing material capable of sealing a hole in the casing and having a width at least equal to the width of the tread band of said tire,
wherein said annular band is situated in a first position out of contact with the inner surface of the casing when the tire is in working condition and
means for inflating said structure to displace said annular band to a second position in contact with the inner surface and below the tread band, said means comprising a bottle for compressed air or gas mounted eccentrically on the rim to which the tire is fitted allowing for generation of a centrifugal force upon the rim when the compressed air or gas flows from said bottle to indicate the occurrence of a puncture or a tear in the tire.

2. The pneumatic tire of claim 1 wherein said liquid gas is a fluoro-chloro hydrocarbon.

3. The pneumatic tire of claim 1 wherein said liquid gas is dichlorodifluoromethane.

4. The pneumatic tire of claim 1 wherein said liquid gas is monochloropentafluoroethane.

5. In a pneumatic tire comprising a tread band, a casing having an inner surface, an inflatable structure inside said casing situated in a first position out of contact with the inner surface of the casing when the tire is in a working condition and means for inflating said inflatable structure to a second position in contact with the inner surface of said casing, said inflatable structure comprising:
an annular band of elastic foam material with prevailingly closed cells, the width of the annular band being at least equal to the width of the tread band of said tire, the thickness of the annular band in the second position being no greater than 20 mm and the moment of polar inertia of the annular band measured with respect to the axis of rotation in said first position being no greater than one fifth of the moment of inertia of the tire devoid of said band;
a pair of deformable sidewalls for said annular band each of which, in said first and second position, leans substantially on a corresponding sidewall of said casing and has an outer circular edge secured to a corresponding lateral edge of said annular band, and extending upon the sidewall of the casing up to the corresponding bead of the tire, said annular band being superimposed on said sidewalls when the inflatable structure is in said first position and being displaced, at the second position of the inflatable structure, into contact with the inner surface of the casing below the tread band; and
means capable of preventing the flow of tire inflation air from said inflatable structure in the space between the outer surface of the latter and the corresponding inner surface of the casing.

6. The pneumatic tire of claim 5 wherein said means capable of preventing the flow of tire inflation air comprises an annular deformable element intended to lean substantially on the sidewalls of said tire and on the rim and provided with two circular edges, each of which is connected to a corresponding lateral edge of said annular band to form a tight annular envelope with said band.

7. The pneumatic tire of claim 5 wherein said means capable of preventing the flow of tire inflation air comprises an inner circular edge on each of said deformable sidewalls tightly connected with a corresponding bead of said tire.

8. The pneumatic tire of claim 5 wherein the inflating means are capable of being automatically actuated when a puncture or tear takes place in said casing.

9. The pneumatic tire of claim 5 wherein the deformable material forming said annular band has an ultimate elongation of at least 150%.

10. The pneumatic tire of claim 5 wherein said inflatable structure, when in said first position, defines a cavity for the inflation air of the tire which lies substantially between the outer surface of said annular band and the inner surface of the casing.

11. The pneumatic tire of claim 5 wherein said annular band is produced in a fashion to generate a pre-established pressure inside the cells of the material such that the pressure after the forming operation is substantially equal to the tire inflation pressure.

12. The pneumatic tire of claim 5 wherein stiffening cords are disposed in at least one layer inside the annular band and in proximity of the inner surface of said band.

13. The pneumatic tire of claim 5 wherein said deformable sidewalls for said annular band form a single piece with said band and are formed of the same material to produce a single element comprising a central band and sidewalls.

14. The pneumatic tire of claim 13 wherein the inner circular edge of each sidewall of the element comprising the central band and sidewalls is secured to the corresponding edge of an annular deformable element designed to lean on the rim and forming a tight annular envelope with said element comprising the central band and sidewalls.

15. The pneumatic tire of claim 13 wherein said inflatable structure further comprises a small carcass of deformable material comprising a central band and sidewalls and provided with beads capable of exerting pressure upon the inner edge of each sidewall of the element comprising a central band and sidewalls to produce a seal between said edge and the corresponding casing bead.

16. The pneumatic tire of claim 15 wherein the small carcass material has an ultimate elongation of at least 150%.

17. The pneumatic tire of claim 15 wherein said small carcass comprises at least one layer of rubber embedding cords having a substantially radial arrangement and wherein the length of the cords is adequate to allow said inflatable structure to pass from said first to said second position without cord elongation.

* * * * *